United States Patent [19]
Raab et al.

[11] 4,035,154
[45] July 12, 1977

[54] APPARATUS FOR THE PREPARATION OF A COMPOUND OR AN ALLOY

[75] Inventors: Gunter Raab, Erlangen; Klaus Zeuch, Eckental, both of Germany

[73] Assignee: Siemens Aktiengesellschaft, Munich, Germany

[21] Appl. No.: 559,014

[22] Filed: Mar. 17, 1975

[30] Foreign Application Priority Data

Mar. 27, 1974 Germany .......................... 2414776

[51] Int. Cl.² .................... B01D 9/00; B01J 17/08
[52] U.S. Cl. ........................ 23/273 SP; 156/609; 156/616 A; 156/617 H; 156/619; 423/111; 423/299
[58] Field of Search ....... 23/273 SP, 273 A, 273 B, 23/273 SP, 273 Z, 286, 290; 156/601, 609, 610, 611, 616, 617, 613, 614, 619; 423/111, 299

[56] References Cited
U.S. PATENT DOCUMENTS

| | | | |
|---|---|---|---|
| 2,893,847 | 7/1959 | Schweickert et al. | 23/273 SP |
| 3,188,373 | 6/1965 | Brunet et al. | 23/273 SP |
| 3,366,454 | 1/1968 | Folberth et al. | 156/616 |
| 3,725,284 | 4/1973 | Touchy | 156/611 |
| 3,877,883 | 4/1975 | Berkman et al. | 423/111 |
| 3,884,642 | 5/1975 | Benedict | 23/273 A |

OTHER PUBLICATIONS

C. J. Frosch et al., J. of the Electrochemical Soc., vol. 108, pp. 251–257, 1961.
F. A. Cunnell et al., J. of Scientific Instruments, vol. 37, Nov. 1966, pp. 410–414.

*Primary Examiner*—Wilbur L. Bascomb, Jr.
*Assistant Examiner*—Barry I. Hollander
*Attorney, Agent, or Firm*—Kenyon & Kenyon, Reilly, Carr & Chapin

[57] ABSTRACT

An apparatus for preparing a semiconductor compound, having one compound with a substantially higher vapor pressure than the other using a closed horizontal tube disposed in a pressure vessel. The two ends of the tube are located in respective heating ovens having their ends facing away from the tube closed. The heating ovens and tube are disposed within a pressure vessel with the heating ovens having an outside diameter which is considerably smaller than the inside diameter of the pressure vessel and with the total length of the heating ovens arranged one behind the other in the axial direction of the tube substantially smaller than the length of the pressure vessel. In addition, a portion of the tube located between the ovens has associated therewith a separate cooling device.

13 Claims, 2 Drawing Figures

APPARATUS FOR THE PREPARATION OF A COMPOUND OR AN ALLOY

BACKGROUND OF THE INVENTION

This invention relates to an apparatus for the preparation of a compound or an alloy having one component with a substantially higher vapor pressure than the other, preferably for the preparation of a semiconductor compound with elements selected from group IIIA and VB of the periodic table and more particularly gallium phosphide, in general and more particularly to an improved apparatus which provides for better cooling of the reaction tube in which such compounds are made.

Apparatus of this general type is known in which the components or elements to be combined to form the compound are situated in a closed horizontal reaction tube with its ends surrounded by hollow cylindrical heating ovens, one oven being provided on each end. The heating ovens are arranged in the axial direction of the tube, one behind the other at a predetermined spacing. At the portion of the tube situated between the two heating ovens, a separate heating device, generally a high-frequency heating coil is provided. The entire system is disposed within a pressure vessel, also referred to as an autoclave, having an internal pressure which can be varied as a function of the pressure inside the tube.

As is well known, gallium phosphide has found much use recently in the manufacture of light-emitting diodes for the visible range because of its large band gap. Polycrystalline gallium phosphide, which is used as the starting material for the manufacture of suitable single crystals, is advantageously synthesized through the reaction of gallium with phosphorus in a closed system.

Typical of one manner of making polycrystalline gallium phosphide is the direct synthesis method using gallium and phosphorus at a temperature of about 1500° C and a pressure of 6 to 35 bar as disclosed by Frosch and Derick in Journal of the Electrochemical Society, Vol 108, page 251, 1961. The components of the semiconductor compound are placed in a quartz tube which is arranged in a furnace and is provided with a high frequency heating device. The high-frequency heating device is inductively coupled to a graphite boat located in the tube and containing one of the components. For the reaction, the boat with the semiconductor component, such as gallium, is moved through the inductively heated zone of elevated temperature within the heating device. After an additional pass, dense polycrystalline gallium phosphide containing, at the end of a synthesized bar, free gallium is obtained. The induction coil for the high-frequency heating device is brought into the pressure vessel radially and is therefore not movable in the axial direction of the system. Thus to obtain a zone melting of the gallium, the tube must be moved and is supported for this purpose in a separate guide tube.

At the high temperatures which are required for the synthesis of the semiconductor compound, the strength of the wall of the tube is considerably reduced. Because of this the tube is disposed in a pressure vessel having a pressure set higher than the pressure in the tube. Since the internal pressure of the tube cannot be measured, the setting of the necessary counter-pressure in the autoclave over the wide range of possible operating pressures is difficult. It will be recognized that the internal pressure in the tube is influenced by various factors such as the temperature of the phosphorus source and thus the vapor pressure of the phosphorus building up above it. In addition, a varying phosphorus pressure can build up in the reaction tube because of the fact that the reaction does not take place in a completely uniform manner. Furthermore, the phosphorus vapor pressure attainable at a given temperature of the phosphorus source also depends on the degree of polymerization of the phosphorus which, as is well known, constitutes a polymorphous element. Although operating conditions can be chosen so that the phosphorus present is completely evaporated as taught by German Pat. No. 1,029,803, the method disclosed therein, namely that of operating without a base body, cannot be used for larger charges.

In systems of this nature, the reaction tube is generally made of quartz. The pressure stability of hollow quartz bodies first increases with increasing temperature until at a temperature of about 800° C it is about one-third higher than at room temperature. However, as the temperature goes above this temperature the stability declines and the maximum temperature at which such quartz ampoules can still be used, is not greatly exceed 950° C. In the region of the reaction temperature of gallium mentioned above, the strength of the wall is thus reduced considerably.

One manner of overcoming these problems is disclosed in U.S. application Ser. No. 455,912 filed Mar. 28, 1974 and assigned to the same assignee as the present invention. The method taught therein synthesizes the desired components at a temperature which is considerably below the melting point of the compound produced. As taught therein this is possible if provision is made for the less volatile component to be heated in a reaction zone 1 to 2 centimeters wide to a temperature 100° to 500° C below the congruent melting temperature of the component produced. At the same time, the pressure of the highly volatile component is set to a predetermined fraction of the decomposition vapor pressure of the compound being produced. Even with this method, however, a reaction temperature is still required which is not much below 1000° C. A further disadvantage is found in this method in that the pressure stability of the quartz tube further decreases as the duration of the pressure stress is extended. Since it is more economical to work with larger sized charges it is generally desirable to attempt to prepare bars of the synthesized compound or alloy which weigh several kilograms or more in a single operation. Charges of such size thus require correspondingly longer operating time. This would require, using the previously disclosed method, that the tube be subjected to a high pressure for a longer time. In addition, in carrying out such a process, the danger of contamination of the reaction product at high temperatures exists.

SUMMARY OF THE INVENTION

In view of these difficulties, it is the object of the present invention to maintain the temperature of the quartz tube at a set level during the synthesis process, particularly in the region of high temperature. At the same time, a stabilization of the temperature distribution within the reaction tube and accordingly, a stabilization of the pressure conditions both within and outside the reaction tube is desired. In accordance with the present invention, these objects are obtained through the following measures: (a) the ends of the heating ovens facing away from the tube are closed to prevent any convective cooling through the space between the ovens and the tube; (b) a separate cooling device is associated with the portion of the reaction tube (also referred to as the ampule) situated between the two heating ovens and which is surrounded by the additional heating device such as a high-frequency heating coil; (c) the outside diameter of the heating ovens is made considerably smaller than the inside diameter of the pressure vessel; and the total length of the overall arrangement in the axial direction is made substantially smaller than the internal length of the pressure vessel. Through these measures, the radial temperature gradient in the unilaterally closed heating ovens is negligibly small. At the same time, due to the sufficient free space between the heating ovens and the wall of the pressure vessel, at least one closed cooling circulation path which cools the reaction tube just in its high-temperature zone is provided. This is a result of the particular kind of cooling and of the gas which is used in the pressure vessel. In other words, the portion of the tube in which the walls are intensively heated by radiation and convection from the boat which is inductively coupled to the coil receives intensive cooling by a convective flow of cooling gas within the pressure vessel. In the disclosed arrangement one end of the ampoule is always supported in one of the ovens thereby permitting it to be arranged in a self-supporting manner without a support tube.

This is a direct result of the fact that a direct flow of cooling gas over the portion of the tube which is intensely heated is established by the present invention.

In order to obtain additional cooling of the tube wall and of the coil which does the heating, the heating device in the form of a coil is made as a hollow conductor through which a cooling medium such as water flows. The inside diameter of the coil structure is made not much larger than the outside diameter of the tube. As a result, the spacing between the heating coil and the tube is quite small and a large amount of heat which radiates from the wall can be removed by the cooling medium in the heating coil to add to the heat removal carried out by convection. Thus, the single coil acts both to heat the boat located within the tube, which boat contains the component with lower vapor pressure, and to further cool the walls of the tube and the coil itself. As is well known, such inductive heating as is carried out by the coil results from an inductive coupling of the high frequency through the tube to the graphite boat.

In accordance with the disclosed embodiment, the autoclave pressure vessel is cylindrical and has a separate cooling jacket. That is to say the envelope of the pressure vessel has a double wall and a coolant such as water is fed into the hollow cylindrical cooling channel which is so produced. This then becomes the separate cooling device for the portion of the tube between the two ovens.

Furthermore, it may be advantageous in some instances to provide the inside wall of the autoclave with cooling fins through which a cooling medium flows. The walls of the autoclave act to cool the gas inside which, in turn, flows over and cools the tube.

In accordance with the disclosed embodiment of the apparatus, the pressure vessel is filled with a cooling gas of high thermal conductivity which removes through closed circulation a major part of the heat from the portion of the tube situated between the free ends of the two heating ovens. Nitrogen $N_2$ will preferably be used as the cooling gas. Additional cooling of the gas circulation is obtained with increased pressure of the cooling gas through an increase of heat absorption and thus heat removal from the quartz tube.

Furthermore, as disclosed, it is advantageous if a predetermined amount of oxygen is added to the gas charge of the autoclave. By having oxygen therein an oxidation of the component with the higher vapor pressure, if that component escapes from leaky capillaries in the reaction tube will result. Because of this oxidation, the escaping material will become visible and the process may be stopped.

DETAILED DESCRIPTION OF THE PREFERRED EMBODIMENT

Figure 1:
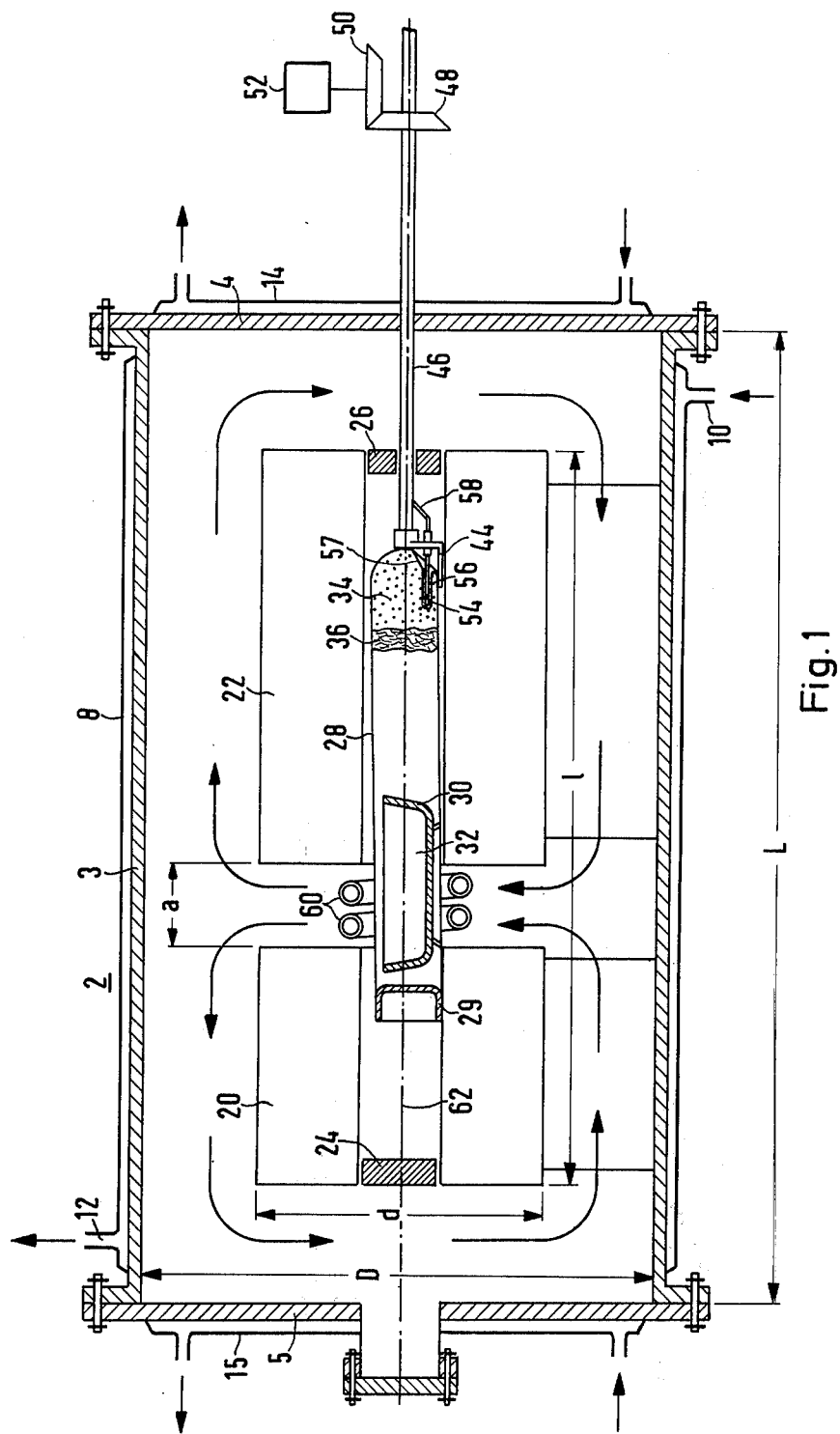
FIG. 1 is a cross-sectional schematic view of an apparatus according to the present invention.

FIG. 1 illustrates a pressure vessel or autoclave 2 made up of a cylindrical shell 3 having covers 4 and 5. The shell 3 is surrounded by a separate cooling jacket 8 which is provided with a cooling inlet 10 and a coolant discharge 12. Lids 4, 5 are similarly provided with cooling jackets 14 and 15 respectively which also have inlets and outlets for a coolant. Disposed within the autoclave 2 are ovens 20 and 22 arranged one behind the other in the axial direction. The ovens are closed off at their free ends with a seal in the form of plugs 24, 26, respectively. Within each of the ovens are found the ends of a quartz tube 28 which has an outside diameter of, for example, 60 millimeters and which contain a graphite boat 30. The boat 30 contains one component 32 of the semiconductor component to be produced. This component may be, for example, gallium. The second component 34, which will be, for example, phosphorous, is disposed at the right-hand end of the tube 28. It is located between the end of the tube and a gas-pervious material such as quartz wool 36. The second component is heated by the oven 22 which, for this reason, is generally referred to as the phosphorus oven. The oven 20 is generally referred to as the afterheating oven.

The end of the reaction tube 28 has a cap 29 sealed in with its end resting on the inside wall of the heating oven 20. The other end of the reaction tube 28 is supported on a holding device 44 preferably designed in the shape of a spoon and which is attached to a push rod 46. The push rod 46 is coupled to drive means 52 by means of bevel gears 48 and 50 which are in meshing relationship. The pushrod 46 will be in the form of a lead screw which engages matching gears internally in bevel gear 48 to impart a linear motion to the pushrod 46.

For purposes of measuring the temperature of the phosphorus 34 directly, a thermocouple 54 is shown as being arranged in a tube 56 sealed into the wall of the tube 28 and extending into the phosphorus 34. The electrical leads 58 from the thermocouple 54 will preferably be brought out through the pushrod 46, which for this purpose, can be made hollow. It can then be connected to an electronic control or regulating device, not shown in detail, to control the pressure in the autoclave 2. This input from the thermocouple will provide an actual value input to the control device which, in conventional fashion, will control the pressure as a function thereof. In accordance with the present invention, the heating ovens 20 and 22 along with heating means 60 in the form of an induction coil must be capable of relative movement with respect to the tube 28. In the illustrated embodiment, the induction coil 60 is a hollow conductor through which a cooling medium, preferably water, will be conducted. The inside diameter of the overall coil 60 is selected so as to match the outside diameter of the tube 28. The spacing of the coil turns from the envelope of the reaction tube 28 is maintained very small and will preferably only be a few millimeters, i.e. in the range of 2 to 12 mm and more particularly 3 to 6 mm. Through such dimensioning, a major portion of the heat of the wall of the tube is removed by the cooling medium of the heating coils 60 so that the temperature of the wall is limited to a safe level.

In the illustrated embodiment, the reaction tube 28 is movable in the axial direction of the system with respect to the heating ovens and coil 60. This direction of motion is indicated by the dash-dot line 62. Movement is obtained through the use of the drive means 52 such as a motor coupled through the gears 50 and 48 to the drive rod 46. This drive system is used to cause the boat 30 to move through the heating zone of the heating coil 60.

However, it is also possible to support the reaction tube 28 in a stationary manner within the pressure vessel and to mount the oven and heating means 60 for movement in the axial direction. In such a case the left-hand end of the reaction tube 28 would also be supported in a support device similar to that at the right-hand end and the ovens and coil 60 mounted for axial movement.

As is evident from the Figure, relative dimensions of the oven and the autoclave 2 are such as to provide a reasonably large space surrounding the overall apparatus including the ovens 20 and 22, the heating means 60 and the tube 28. As a result, cooling gas within the autoclave 2 and having a flow as indicated by the unlabelled arrows on the Figure will flow in direct contact with the portion of the tube 28 between the two heating ovens and which is in the vicinity of the heating means 60. The gas, which is heated as it passes over this heated zone will then be cooled by the cylindrical wall 3 of the autoclave 2 which, in turn, is cooled by the cooling medium flowing between the wall 3 and the jacket 8. Similarly, cooling will take place at the covers 4 and 5. Note, the gas heated in the middle region in the vicinity of the heating coil 60 will rise, travelling along the upper surface of the autoclave and be cooled as it moves therealong and down the covers 14 and 15 to the bottom of the autoclave after which it will again flow toward the heated region to replace the heated gas which has risen due to convection. In this manner the flow paths indicated are established. Through this flow, the average wall temperature of the reaction tube 28 can be maintained in this region at about 750° and should not exceed 850° C. Through this intensive cooling, the reaction tube 28 can be arranged in the autoclave in a self-supporting manner, i.e. it does not require a separate guide tube even for relatively large charges.

The seals 24 and 26 of the two ovens 20 and 24 prevent convection through the inner spaces of the ovens which could result in an unfavorable temperature distribution within these ovens.

Between the outer shell of the ovens 20 and 22 and the inner wall 3 of the autoclave as well as between the ends of the ovens and the covers 4 and 5 a sufficient space must be provided in the manner shown to obtain the necessary closed gas flow. Typically, the outside diameter of the reaction tube can be 60 millimeters, the distance $a$ between the two ovens 20 and 22, 100 millimeters; the outside diameter $d$ of the ovens 20 and 22, 150 millimeters and an inside diameter D of the autoclave 250 millimeters. The length $l$, for example of the two ovens arranged one behind the other with the spacing of $a$ can be 960 mm and the inside length L of the autoclave tube 1260 mm. With such dimensions good cooling in the zone of high temperature of the reaction tube 28 is obtained. With these dimensions, approximately 8000 to 9000 cm$^2$ of the wall of the pressure vessel are useable as cooling area. With this much cooling space, the portion of the wall of the reaction tube to be cooled, which has an area of about 150 to 200 cm$^2$ will be held to a temperature which does not appreciably exceed 800° C during the synthesis. Preferably this temperature will be maintained in the range of 600° to 800° C and more preferably to between 650° and 700° C when gallium phosphide is being prepared.

The cooling effect due to convection increases with increasing gas pressure and with an increase in the thermal conductivity in the gas being used. If helium is used as the cooling gas, its heat conductivity is greater by a factor of approximately 7 than nitrogen; however, tests have shown that nitrogen is sufficient for cooling. It must be remembered that the removal of too much heat of the wall of the reaction tube 28 must also be avoided. It cannot be cooled below a temperature of 520° C or the precipitation of phosphorous on the inside wall of the reaction tube could occur. As a result of such precipitation, the internal pressure of the tube would decrease and it would be impossible to view the compound being generated in the boat 30.

Figure 2:
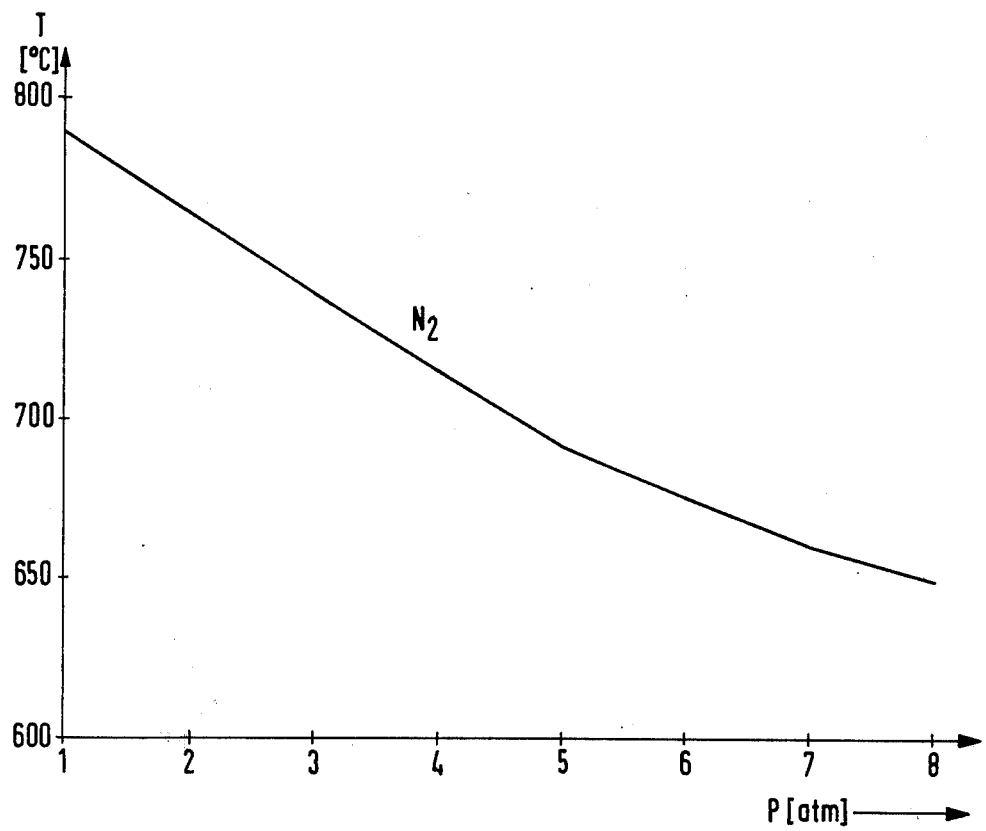
FIG. 2 is a curve showing the cooling effect of the circulating gas as a function of pressure.

The effect of pressure on the temperature at the highly heated portion of the reaction tube is illustrated by FIG. 2. On this Figure, the surface temperature of the tube in °C is plotted versus the pressure in atm (bar). At normal atmospheric pressure, the wall is cooled to approximately 780° C. Increasing the pressure to 4 bar results in a wall temperature which is only reduced to about 720° C. With a pressure of 8 bar the wall temperature drops to about 650° C.

For the process of synthesizing gallium phosphide, the reaction boat 30 containing the gallium will be inductively heated in a narrow reaction zone to a temperature of between 800° and 1000° C. During this initial heating the after heating oven 20 will be brought to about 750° C and the phosphorus oven 22 to about 300° to 400° C. Then, while the temperature of the reaction boat 30 is increased, over a period, for example of 60 minutes to a final temperature of, for example, 1250° C, the temperature of the phosphorus oven 22 is brought to a final temperature of 510° C. During this time the gas pressure within the autoclave 2 can be increased to an extent that the heat convection described above will result in a mean wall temperature for the reaction tube 28 which is limited to about 800° C in the high temperature zone of the induction coil 60. The higher the pressure at which the cooling gas is maintained on the outside wall of the reaction tube, the more intensive is its cooling effect. Since the temperature of the reaction tube 28 in the high temperature zone between the two ovens 20 and 22 is limited to a relatively low temperature, and assuming an appropriately high strength in the tube material, the pressure of the cooling gas inside the pressure vessel 2 may exceed the pressure in the tube 28. The pressure of this cooling gas will, in general, be maintained at about 8 to 12 bar and, with larger charges and correspondingly increased strength of the reaction tube 18 may even be increased to 12 to 16 bar or more.

During operation of the apparatus of the present invention, it is advantageous to mix with the cooling gas a predetermined amount of a gas which is capable of reacting with the highly volatile component. Such a gas is preferably oxygen or a oxygen containing compound which will so react. For example, this compound may be carbon dioxide. In any case oxygen itself or a compound containing oxygen in the percentage range of 0.5 to 25% is preferred. This content of oxygen will lead to the oxidation of the phosphorus, should the evaporated phosphorus escape from capillaries of a leaking reaction tube 28. Without means such as this, such an escape could not be observed. However, with oxygen in the gas a reaction will occur between the oxygen in a small amount and the heated phosphorus or other element which escapes through a leak. It is desireable that the cooling gas contain between 1.5 and 3% oxygen. More specifically, it is desireable to have a content of oxygen which is approximately 2%. The oxidation product, e.g. $P_2O_5$ will be noticeable through the appearance of fog or through condensation in the form of droplets at cooled places such as at the viewing window of the pressure vessel. It is then possible to use a detector which responds to acid or to a change of thermal conductivity as well as detectors responding to fog or smoke to provide a suitable signal output to indicate a malfunction and/or shut down of the installation.

EXAMPLE 1

To synthesize gallium phosphide, 510 g., i.e. 16.5 mol of red phosphorus in highly purified form are filled into a previously carefully cleaned and unilaterally closed quartz tube 28 having an inside diameter of 54 mm and a wall thickness of 2 to 3 mm. The phosphorus is fixed in the right-hand part of the tube 28 using loosely packed quartz wool 36. A reaction boat 30, having a width of 48 mm, a depth of 44 mm and a length of 300 mm, has 1150 g., i.e. 16.5 mol of gallium placed therein. The reaction tube 28 is sealed off in a vacuum of $10^{-5}$ Torr, using a sealing cap and to establish a tube length of 60 mm. The reaction tube 28 is heated first to a temperature between 800° and 1000° inductively in the narrow reaction zone while the after heating oven is brought to a temperature of about 750° C and the phosphorus oven 22 to about 300° to 400° C. Then, over a period of approximately 60 minutes, the temperature of the reaction boat is brought to 1250° C and the temperature of the phosphorus oven 22 to a final temperature of 510° C. Thereupon the tube 28 is pushed through the oven system with a velocity of approximately 40 mm/hour. After the reaction, the unreacted gallium, which has been transported by the process to the end of the ingot which is formed is removed by acid treatment or the like. The result is a dense ingot weighing 1500 g which is polycrystalline gallium phosphide which can be directly used for growing single crystals using what is referred to as the protective melting process.

EXAMPLE 2

With all other conditions the same and a phosphorus charge of 805 g., i.e. 26 mol, and a gallium charge of 1815 g or 26 mol, placed in a tube with a diameter of 74 mm and 700 mm length, a galium phosphide ingot weighing 2400 g is obtained using a feed velocity of 33 mm/hour.

The apparatus of the present invention is well suited for the synthesis of various semiconductor compounds. In accordance with the examples above, it is particularly suited for forming gallium phosphide. However, it is also possible to use if for the preparation of other compounds and alloys, particularly compounds of the type known as IIIA – VB compounds, i.e. compounds made up from elements of groups IIIA and VB of the periodic table. For example, in addition to phosphorus, arsenic and sulfur may be used and instead of gallium, indium and aluminum. An example of one of these follows.

EXAMPLE 3

Using the above described apparatus, 155 g or 5 mol of red phosphorus and 575 g or 5 mol of indium are arranged in a quartz tube with a diameter of 54 mm and a length of 600 mm. Following the process as outlined in Example 1 above and a feed velocity of 25 mm/hour and, after removing the indium-enriched end, a single-phase polycrystalline indium phosphide ingot weighing 650 g is obtained.

Thus, an improved apparatus for the preparation of a compound or alloy having one component with a considerably higher vapor pressure than the other using a closed system has been disclosed. Although specific embodiments of the apparatus have been disclosed, it will be obvious to those skilled in the art that various modifications may be made without departing from the spirit of the invention which is intended to be limited solely by the appended claims.

What is claimed is:

1. In apparatus for the preparation of a compound or alloy which includes one compound having considerably higher vapor pressure than the other, the apparatus including a closed horizontal reaction tube whose ends are surrounded by closely spaced hollow, cylindrical heating ovens, the tube and ovens being arranged in a closed pressurized vessel with the ovens one behind the other in the axial direction of the tube, with additional heating means surrounding a narrow portion of the reaction tube situated between the heating ovens, and means to move at least a portion of the closed horizontal reaction tube through the narrow zone between said heating ovens, an arrangement which permits improved cooling of the narrow zone between the heating ovens comprising:
   a. the heating ovens spaced from the inside of the pressurized vessel so that a free space remains between said ovens and said vessel at all points, said space being in communication with the narrow zone between the heating ovens;
   b. means closing off the ends of the heating ovens facing away from the tube;
   c. a cooling gas of high thermal conductivity filling said free space and contacting the inside of said pressurized vessel; and
   d. means for cooling said pressurized vessel, whereby said pressurized vessel will cool said cooling gas causing convection currents to be set up which, because of said ovens being closed off will be concentrated in the narrow portion of said tube between said ovens to thereby carry out improved cooling of the tube at said narrow portion.

2. Apparatus according to claim 1 wherein said pressurized vessel is cylindrical and wherein said means for cooling said pressurized vessel comprise a separate cooling jacket surrounding said pressurized vessel to form a hollow cylindrical cooling channel.

3. Apparatus according to claim 1 wherein said reaction tube is arranged within and supported by said heating ovens.

4. Apparatus according to claim 2 wherein said additional heating device comprises a high-frequency induction coil made up of hollow coils through which a cooling medium can be directed, the inside diameter of the high frequency induction coil being selected so as to closely match the outside diameter of the reaction tube.

5. Apparatus according to claim 1 wherein said additional heating device comprises a high-frequency induction coil made up of hollow coils through which a cooling medium can be directed, the inside diameter of the high frequency induction coil being selected so as to closely match the outside diameter of the reaction tube.

6. Apparatus according to claim 3 wherein said cooling medium is nitrogen.

7. Apparatus according to claim 3 wherein said cooling gas is at a pressure above atmospheric pressure.

8. Apparatus according to claim 3 wherein a reactive gas is added to said cooling gas.

9. Apparatus according to claim 8 wherein said reactive gas is oxygen.

10. Apparatus according to claim 8 wherein said reactive gas is carbon dioxide.

11. Apparatus according to claim 8 wherein said reactive gas is a gas containing between 0.5 to 25% oxygen.

12. Apparatus according to claim 11 wherein said cooling gas contains between 1.5 and 3% oxygen.

13. Apparatus according to claim 12 wherein said cooling gas contains approximately 2% oxygen.

* * * * *